US009218336B2

(12) United States Patent
Cohen et al.

(10) Patent No.: US 9,218,336 B2
(45) Date of Patent: Dec. 22, 2015

(54) EFFICIENT IMPLEMENTATION OF MORPHOLOGY FOR AGGLUTINATIVE LANGUAGES

(75) Inventors: Daniel Cohen, Harei Yehuda (IL); Yigal Shai Dayan, Jerusalem (IL); Josemina Marcella Magdalen, Jerusalem (IL); Victoria Mazel, Jerusalem (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2764 days.

(21) Appl. No.: 11/692,228

(22) Filed: Mar. 28, 2007

(65) Prior Publication Data
US 2008/0243478 A1 Oct. 2, 2008

(51) Int. Cl.
G06F 17/28 (2006.01)
G06F 17/27 (2006.01)

(52) U.S. Cl.
CPC .................. G06F 17/2755 (2013.01)

(58) Field of Classification Search
CPC ............ G06F 17/2705; G06F 17/2881; G06F 17/271; G06F 17/2775; G06F 17/2755; G06F 17/28; G06F 17/2863; G06F 17/30985
USPC .................................................. 704/1, 7–10
See application file for complete search history.

(56) References Cited

U.S. PATENT DOCUMENTS

| | | | | |
|---|---|---|---|---|
| 5,475,587 A * | 12/1995 | Anick et al. | ............. | 704/9 |
| 5,559,693 A * | 9/1996 | Anick et al. | ............. | 704/9 |
| 5,805,832 A * | 9/1998 | Brown et al. | ............. | 711/1 |
| 6,073,098 A * | 6/2000 | Buchsbaum et al. | ......... | 704/255 |
| 6,405,161 B1 * | 6/2002 | Goldsmith | ............. | 704/9 |
| 6,430,557 B1 * | 8/2002 | Gaussier et al. | ............. | 704/9 |
| 7,181,386 B2 * | 2/2007 | Mohri et al. | ............. | 704/1 |
| 7,289,948 B1 * | 10/2007 | Mohri | ............. | 704/9 |
| 7,398,197 B1 * | 7/2008 | Mohri et al. | ............. | 704/1 |
| 7,409,334 B1 * | 8/2008 | Shoemaker | ............. | 704/8 |
| 7,624,436 B2 * | 11/2009 | Balakrishnan et al. | ......... | 726/13 |
| 8,131,537 B2 * | 3/2012 | Nakayama | ............. | 704/8 |
| 2003/0074184 A1 * | 4/2003 | Hayosh et al. | ............. | 704/1 |
| 2003/0149562 A1 * | 8/2003 | Walther | ............. | 704/243 |
| 2005/0086048 A1 * | 4/2005 | Nakayama | ............. | 704/4 |
| 2006/0200336 A1 * | 9/2006 | Cipollone et al. | ............. | 704/4 |
| 2007/0106492 A1 * | 5/2007 | Kim | ............. | 704/9 |
| 2007/0162410 A1 * | 7/2007 | Hinchey et al. | ............. | 706/48 |
| 2008/0082484 A1 * | 4/2008 | Averbuch et al. | ............. | 707/3 |

OTHER PUBLICATIONS

Eryiğit et al. "An Affix Stripping Morphological Analyzer for Turkish", Proceedings of the IASTED International Conference Artificial Intelligence and Applications, Innsbruck, Austria, Feb. 2004, pp. 299-304.*

(Continued)

*Primary Examiner* — Abdelali Serrou

(74) *Attorney, Agent, or Firm* — Marcia L. Doubet

(57) ABSTRACT

Constructing an automaton for automated analysis of agglutinative languages comprises: constructing an affix automaton for each of a plurality of affix types of an agglutinative language, where each of the affix types is associated with one or more affixes associated with a morphological concept; combining any of the affix automatons to form a plurality of template automatons, where each of the template automatons is patterned after any of a plurality of agglutination templates of any of the affix types for the language; and combining the template automatons into a master automaton.

25 Claims, 5 Drawing Sheets

(56) References Cited

OTHER PUBLICATIONS

Cho et al. "Automatic Stemming for Indexing of an Agglutinative Language", Advances in Information Systems, vol. 2457, Jan. 2002, pp. 154-165.*

Oflazer, "Two-level description of Turkish Morphology", Literary and Linguistic Computing, vol. 9, No. 2, 1994, p. 472.*

Alegria et al. "Using Finite State Technology in Natural Language Processing of Basque". 6th Conf. on Implementation and Applications of Automata. CIAA 2001, pp. 1-12.*

Zajac. "Feature Structures, Unification and Finite-State Transducers". In: FSMNLP'98, International Workshop on Finite State Methods in Natural Language Processing, Ankara,Turkey, 1998, pp. 101-109.*

Prószéky et al. "A Unification-based Approach to Morpho-Syntactic Parsing of Agglutinative and Other (Highly) Inflectional Languages". Proceedings of the 37th Annual Meeting of ACL, College Park,1999, pp. 261-268.*

Pretorius et al. "Finite-State Computational Morphology: An Analyzer Prototype for Zulu". Machine Translation 18, 2003, pp. 191-212.*

Narayanan et al. "Finite-state Abstractions on Arabic Morphology". Artificial Intelligence Review 7, 1994, pp. 373-399.*

Amin, A. et al., "Recognition of Hand-printed Chinese Characters Using Decision Trees/Machine Learning C4.5 System ", Pattern Analysis and Applications, vol. 1, Issue 2, 1998, 130-141.*

Sproat et al., A Stochastic Finite-State Word-Segmentation Algorithm for Chinese, 1996, Association for Computational Linguistics, pp. 377-404.*

Sproat et al. "A Stochastic Finite-State Word-Segmentation Algorithm for Chinese", 1996, Association for Computational Linguistics, pp. 377-404.*

Bahl et al. "A tree-based statistical language model for natural language speech recognition", IEEE transactions on acoustics, speech, and signal processing, vol. 37, No. 7, Jul. 1989, pp. 1001-1008.*

* cited by examiner

```
Noun_Honor:          님
Noun_Plural:         들
Noun_Case:           가,이,께서,은,는,께서는,을,를,께,에게서,에게,의,으로,로,에서,에,아,이어,야,
Noun_Suffix:         쪽,적,하,식,간,당,별,용,가,양,안으로,옆에,에는,까지,에,상,인,품,국,적,도록,로부터,더
Prepositions:        화,로부터,원어,안에,                                 경,껏,경,재,는,부터,로부터,가,이다,든지,이
Noun_Conjunctions:   과,만,뿐만,도,나,이나,                  와,처럼,보다,보다도,가,이다,든지,이
Voice_Pass_Caus:     어지,어지,여주,이,게하,어저,여저,여주,어,히,지,되,시키
Progressive:         고있,고계
Verb_Honor:          시
Tense:               었,았,었었,을것이,ㄹ것이,겠,있을것이,었겠,었젔,었겠,겠,었겠,ㅆ,ㅆ있
Verb_SentType_Style: 리라,다,ㄴ다,는다,느냐,다라,다라,다라,자,어라,거라,든군,ㄴ군,더군,ㅂ니다,는
Politeness:          요
Verb_Participle:     든,ㄴ,은,던,을,ㄹ,는지
Verb_Gerund:         기,것,음,는것,이,ㅁ
Verb_Conjunctions:   야할지,서야,이야,이라고,ㄹ려,여야,한,게,며,와,과,만,뿐,도,나,이나,로서,으
Number_Derivation:   번째의,번째
Verb_Negation:       지,서는
Noun_Verbalization:  위,하
Verb_Infinitive:     라,려는
Adverbialization:    히,하게,게,ㅂ게
```

Fig. 2

Verb: Noun_Verbalization, Voice_Pass_Caus, Progressive, Verb_Honor, Tense, Verb_SentType_Style, Politeness, Verb_Conjunctions
Noun: Noun_Honor, Noun_Suffix, Noun_Plural, Prepositions, Noun_Case, Noun_Conjunctions
Verb: Noun_Verbalization, Voice_Pass_Caus, Progressive, Verb_Honor, Tense, Verb_SentType_Style, Politeness, Verb_Gerund, +, Noun_Case, Verb_Conjunctions
Verb: Noun_Verbalization, Voice_Pass_Caus, Progressive, Verb_Honor, Tense, Verb_SentType_Style, Politeness, Verb_Participle, Verb_Conjunctions
Number: Number_Derivation, +, Noun_Case
Verb: Noun_Verbalization, Verb_Gerund, +, Noun_Suffix, Noun_Plural, Prepositions, Noun_Case, Noun_Conjunctions
Verb: Noun_Verbalization, Voice_Pass_Caus, Verb_Gerund, +, Noun_Case, Noun_Conjunctions
Verb: Noun_Verbalization, Verb_Negation
Verb: Noun_Verbalization, Verb_Infinitive
Adverb: Adverbialization

Fig. 3

| SYLLABIC FORM | LETTER EQUIVALENT |
|---|---|
| 졌 | 지었 |
| 거 | 것이 |
| 켜 | 하것이 |
| 해 | 하이어 |
| 했 | 하이엇 |
| 죠 | 지요 |
| 져 | 저어 |
| 켜 | 키어 |
| 놔 | ㅗㅏ |
| 눠 | ㅗㅓ |
| 돼 | ㅗㅓ |
| 뉘 | ㅜㅣ |
| 긔 | ㅡㅣ |
| 뒤 | ㅜㅣ |
| 뚜 | ㅜㅓ |
| 두 | ㅡㅓ |
| 를 | 르ㅁ |
| 함 | ㅎㅁ |
| 화 | ㅎㅁ |

Fig. 4

EFFICIENT IMPLEMENTATION OF MORPHOLOGY FOR AGGLUTINATIVE LANGUAGES

FIELD OF THE INVENTION

The present invention relates to the field of agglutinative language morphology, and in particular to systems and methods for automated agglutinative language analysis.

BACKGROUND OF THE INVENTION

Agglutinative languages, such as Korean, are synthetic languages where each affix typically represents one unit of meaning. In such languages affixes typically do not change form when combined with other affixes. Agglutinative languages tend to have a high rate of affixes/morphemes per word, and tend to be very regular.

Morphological analysis of languages can be used to support computer-based applications, such as natural-language query processing required by search engines, by decomposing text input into affixes and lemmas. A common approach to morphological analysis relies on a small number of possible affixes, so that all possible forms for every word can be easily and efficiently synthesized. In non-agglutinative languages such as English, French, Spanish, and other European languages, only one affix may be attached to a word. These affixes may be maintained in a file or database together with a description of their morpho-syntactic meaning. These affix-lists are used in conjunction with predefined lexicons to analyze the words. However, in agglutinative languages such as Korean, each word may have multiple affixes in various combinations, making the naïve approach mentioned above unsatisfactory for automated word analysis of such languages.

SUMMARY OF THE INVENTION

The present invention in embodiments thereof discloses novel automated agglutinative language analysis where a finite automaton for morphological analysis of an agglutinative language is generated given morphological concepts expressed by various affixes of the language and combinations of these morphological concepts for every part of speech.

In one aspect of the present invention a method is provided for constructing an automaton for automated analysis of agglutinative languages, the method including constructing an affix automaton for each of a plurality of affix types of an agglutinative language, where each of the affix types is associated with one or more affixes associated with a morphological concept, combining any of the affix automatons to form a plurality of template automatons, where each of the template automatons is patterned after any of a plurality of agglutination templates of any of the affix types for the language, and combining the template automatons into a master automaton.

In another aspect of the present invention, the constructing an affix automaton includes constructing any of the affix automatons from the union of a plurality of the affixes associated with one of the morphological concepts.

In another aspect of the present invention, the constructing an affix automaton includes constructing any of the affix automatons starting with the last letter of each of the affixes and continuing towards the beginning of each of the affixes.

In another aspect of the present invention, the constructing an affix automaton includes breaking down any of the affixes into its constituent letters prior to construction of its associated affix automaton.

In another aspect of the present invention, the combining any of the affix automatons includes combining where each of the agglutination templates defines an order in which the affixes may agglutinate to a stem word.

In another aspect of the present invention, the combining any of the affix automatons includes combining any subset of the affix types indicated in any of the agglutination templates, provided that the subset maintains the same relative order as in the agglutination template.

In another aspect of the present invention, the combining any of the affix automatons includes combining any of the affix types selected from a head section of any selected one of the agglutination templates, a gerund affix type of the selected agglutination template, and any of the affix types selected from a tail section of the selected agglutination template, where the agglutination template has a gerund separator.

In another aspect of the present invention, the combining any of the affix automatons includes combining any of the affix automatons in the order in which their corresponding affix types appear in any selected one of the agglutination templates.

In another aspect of the present invention, the combining any of the affix automatons includes combining starting with the starting with the last affix type in the selected agglutination template.

In another aspect of the present invention, a system is provided for analyzing words of agglutinative languages, including a master automaton formed by constructing an affix automaton for each of a plurality of affix types of an agglutinative language, where each of the affix types is associated with one or more affixes associated with a morphological concept; combining any of the affix automatons to form a plurality of template automatons, where each of the template automatons is patterned after any of a plurality of agglutination templates of any of the affix types for the language; and combining the template automatons, and computer-implemented instructions analyzing a word using the master automaton.

In another aspect of the present invention, the analyzing is operative to perform a letter-by-letter traversal of the master automaton using the letters of a word, where each letter of the word is tested by a transition function of the automaton.

In another aspect of the present invention, the analyzing is operative to record each successfully-traversed affix type within the automaton until no more valid affixes are discovered for the word.

In another aspect of the present invention, the analyzing is operative to indicate an expected part of speech based on which of the agglutination templates were traversed within the automaton.

In another aspect of the present invention, the analyzing is operative to perform a dictionary look-up of a portion of the word beyond the letter corresponding to the last valid affix found during the traversal of the automaton to determine the part of speech for the word.

In another aspect of the present invention, the analyzing is operative to compare the part of speech indicated for the word by the automaton with the part of speech indicated for the word by the dictionary look-up to determine whether the parts of speech match.

In another aspect of the present invention, a system is provided for constructing an automaton for automated analysis of agglutinative languages, the system including constructing an affix automaton for each of a plurality of affix types of an agglutinative language, where each of the affix types is associated with one or more affixes associated with a morphological concept, combining any of the affix automatons to form a plurality of template automatons, where each of the template automatons is patterned after any of a plurality of agglutination templates of any of the affix types for the language, and combining the template automatons into a master automaton.

In another aspect of the present invention, the constructing an affix automaton is operative to construct any of the affix automatons from the union of a plurality of the affixes associated with one of the morphological concepts.

In another aspect of the present invention, the constructing an affix automaton is operative to construct any of the affix automatons starting with the last letter of each of the affixes and continuing towards the beginning of each of the affixes.

In another aspect of the present invention, the constructing an affix automaton is operative to break down any of the affixes into its constituent letters prior to construction of its associated affix automaton.

In another aspect of the present invention, the combining any of the affix automatons is operative to combine where each of the agglutination templates defines an order in which the affixes may agglutinate to a stem word.

In another aspect of the present invention, the combining any of the affix automatons is operative to combine any subset of the affix types indicated in any of the agglutination templates, provided that the subset maintains the same relative order as in the agglutination template.

In another aspect of the present invention, the combining any of the affix automatons is operative to combine any of the affix types selected from a head section of any selected one of the agglutination templates, a gerund affix type of the selected agglutination template, and any of the affix types selected from a tail section of the selected agglutination template, where the agglutination template has a gerund separator.

In another aspect of the present invention, the combining any of the affix automatons is operative to combine any of the affix automatons in the order in which their corresponding affix types appear in any selected one of the agglutination templates.

In another aspect of the present invention, the combining any of the affix automatons is operative to combine starting with the starting with the last affix type in the selected agglutination template.

In another aspect of the present invention a computer program is provided embodied on a computer-readable medium, the computer program including a first code segment operative to construct an affix automaton for each of a plurality of affix types of an agglutinative language, where each of the affix types is associated with one or more affixes associated with a morphological concept, a second code segment operative to combine any of the affix automatons to form a plurality of template automatons, where each of the template automatons is patterned after any of a plurality of agglutination templates of any of the affix types for the language, and a third code segment operative to combine the template automatons into a master automaton.

BRIEF DESCRIPTION OF THE DRAWINGS

The present invention in embodiments thereof will be understood and appreciated more fully from the following detailed description taken in conjunction with the appended drawings in which:

FIG. 2 is an example of a table of morphological concepts and their affixes for the Korean language;

FIG. 3 is an example of a template table of valid affix templates of the present invention for the Korean language;

FIG. 4 is an example of a syllable decomposition table of the present invention for the Korean language.

DETAILED DESCRIPTION OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1:
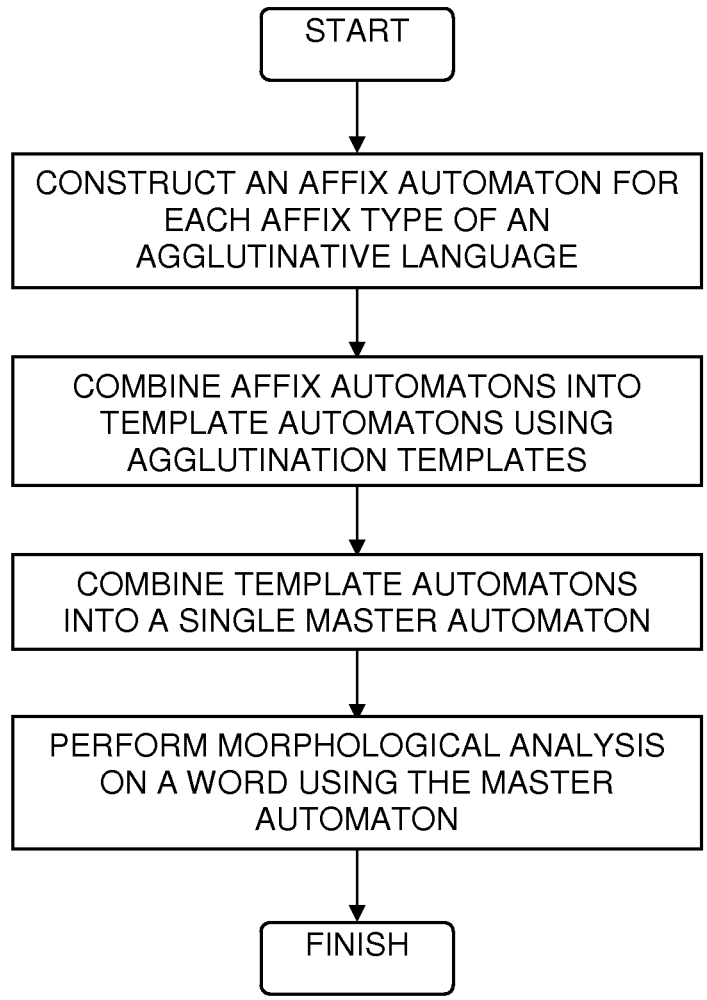
FIG. 1 is a simplified conceptual illustration of a method for constructing an automaton for automated analysis of agglutinative languages, operative in accordance with an embodiment of the invention.

Reference is now made to FIG. 1, which is a simplified conceptual illustration of a method for constructing an automaton for automated analysis of agglutinative languages, operative in accordance with an embodiment of the invention. In the method of FIG. 1 an affix automaton is constructed for each affix type identified for an agglutinative language, where each affix type represents a single morphological concept, and where each affix automaton represents the union of affixes associated with the morphological concept. A table of affix types and their related affixes is shown by way of example for the Korean language in FIG. 2. The affix automatons are then combined into template automatons, where each template automaton is patterned after an agglutination template, such as the agglutination templates shown by way of example for the Korean language in FIG. 3. The template automatons are then combined into a single master automaton which may then be used to perform a morphological analysis on a word of the target language.

Reference is now made to FIG. 2, which is an example of a table of affix types and their affixes for the Korean language. Each line in the table of FIG. 2 represents one affix type for which one affix automaton is preferably constructed. In the example shown, the affixes associated with each affix type are separated by commas. Each affix automaton represents the union of the comma-separated affixes for one affix type. For example, the affix type Verb_Participle includes seven different affixes. Each affix automaton is preferably constructed starting with the last letter of each affix and continuing towards the beginning of each affix in order to support morphological analysis of a word starting with the end of the word. Where an affix represents a contraction of multiple letters, the affix is preferably broken down into its constituent letters prior to construction of its associated affix automaton. A decomposition table may be used for this purpose, such as the decomposition table shown by way of example for the Korean language in FIG. 4.

Reference is now made to FIG. 3, which is an example of agglutination templates for the Korean language. Each part of speech may have one or more agglutination templates, where each agglutination template defines the order in which affixes may agglutinate to a stem word. In the following example, the template Verb: Noun_Verbalization, Voice_Pass_Caus, Progressive, Verb_Honor, Tense, Verb_SentType_Style, Politeness, Verb_Conjunctions indicates that in the Korean language a verb stem can be followed by any subset of affix types indicated in the template, provided that they maintain the same relative order as in the template. Thus, Verb: Voice_Pass_Caus, Verb_Honor is a legal sequence, while Verb: Verb_Honor, Voice_Pass_Caus is not.

Some templates may include what is referred to herein as a "gerund separator" which is a characteristic of the Korean language. In the example shown in FIG. 3, templates that include the + symbol indicate the presence of a gerund separator immediately preceding the + symbol. This may be understood to break the template into three sections: a head, a gerund, and a tail. Gerund separators add an additional constraint to the agglutination process, such that when one or more affix types are selected from the tail section, the gerund affix type must also be selected. For example, the template Verb: Noun_Verbalization, Voice_Pass_Caus, Verb_Gerund, +, Noun_Case, Noun_Conjunctions indicates that if either or both of the Noun_Case and Noun_Conjunctions affix types are selected, it/they must be preceded by a Verb_Gerund.

As is described hereinabove with reference to FIG. 1, a template automaton is created for each template by combining the affix automatons for each of the affix types in the template in the order in which they appear in the template, preferably starting with the last affix type in the template in order to support morphological analysis of a word starting with the end of the word. For example, for the sequence Prepositions, Noun_Case, Noun_Conjunctions, the affix automatons are joined to each other in the order Noun_Conjunctions, Noun_Case, Prepositions. When combined into a template automaton, each affix automaton may have an alternative path that bypasses it entirely where the agglutinative language allows for optional affix types in a template. Thus, Noun_Conjunctions can link directly to Prepositions, bypassing Noun_Case. The use of alternative paths ensures that every ordered subset of items in a template constitutes a valid path within the template automaton.

If the sequence contains a gerund separator one automaton is preferably constructed from the affix types in the head section and another from the tail section, whereupon the tail, gerund and head automatons are joined into a single template automaton such that if an affix type in the tail section item is traversed, the end state may only be reached by passing through the gerund.

Once all of the template automatons have been created they are joined into a single master automaton which may then be used for performing morphological analysis on a word of the target agglutinative language. The master automaton is preferably a minimal state deterministic automaton. On successful traversal, the master automaton preferably provides the part of speech represented by the word, along with the word root and a sequence of affixes.

Figure 5:
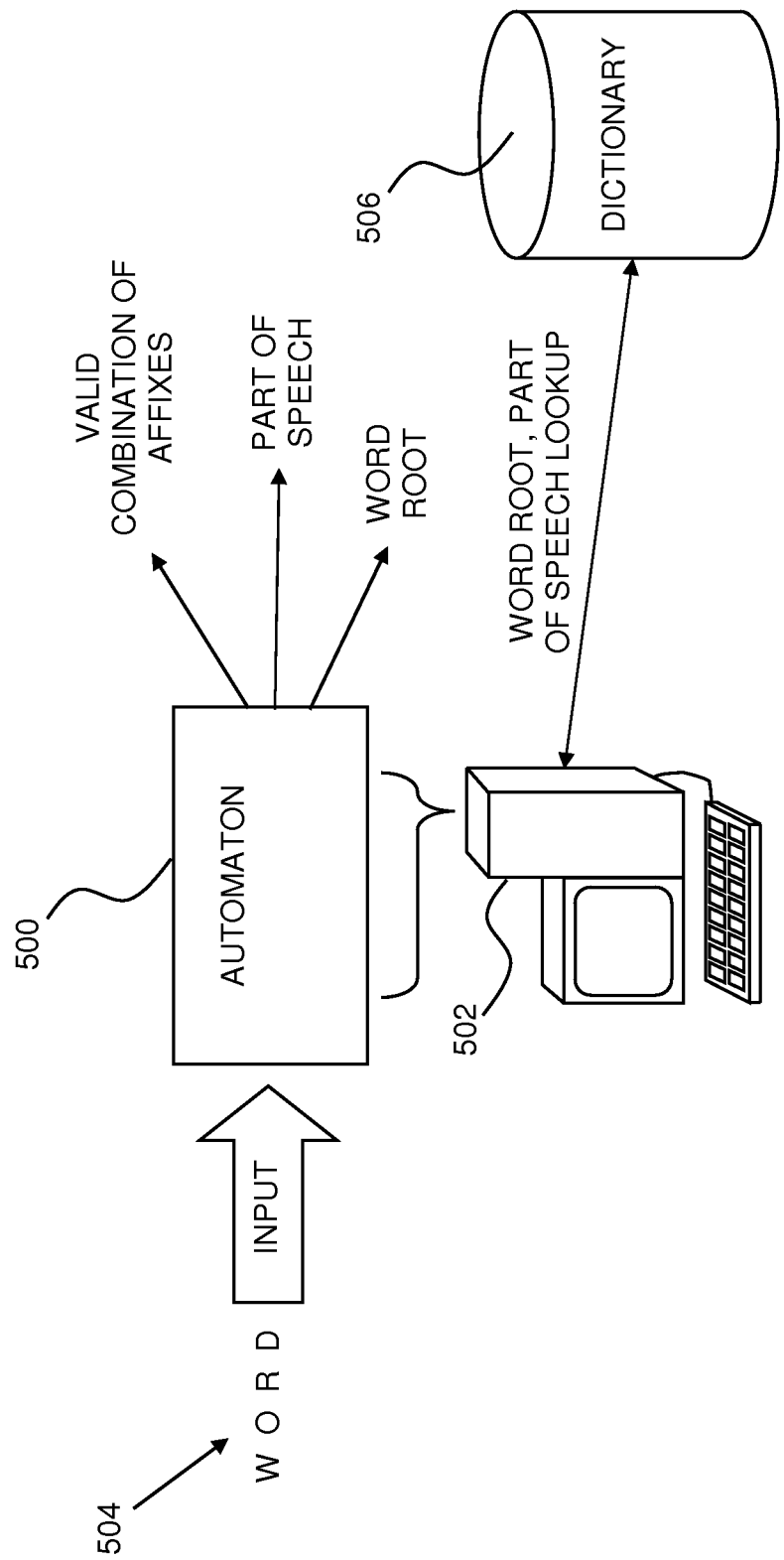
FIG. 5 is a simplified illustration of a system for analyzing words of agglutinative languages, constructed and operative in accordance with an embodiment of the present invention.

Reference is now made to FIG. 5, which is a simplified illustration of a system for analyzing words of agglutinative languages, constructed and operative in accordance with an embodiment of the present invention. In the system of FIG. 5 an automaton 500 constructed using the method of FIG. 1 is implemented by a computer 502 in computer hardware and/or computer software using conventional techniques. A word 504 of the agglutinative language for which automaton 500 was constructed is provided to automaton 500 using any suitable input means implementable by computer hardware and/or software. After any necessary preprocessing, such as the decomposition described hereinabove with reference to FIG. 4, the word is fed last-letter-first into automaton 500. Each previous letter of the word is tested by the next transition function of automaton 500, and each successfully-traversed affix type within automaton 500 is recorded until no more valid affixes are discovered for the word. On successful traversal, the automaton preferably indicates an expected part of speech based on the agglutination template that was traversed within automaton 500. The portion of the word beyond the letter corresponding to the last valid affix found during the traversal of the nodes of automaton 500 may then be looked up within a dictionary 506 of word roots to determine whether the word is a noun, verb, etc. The word root may be modified to reverse the decomposition described hereinabove with reference to FIG. 4. The part of speech indicated for the word by automaton 500 may be compared with the part of speech indicated for the word by dictionary 506 to determine whether the indicated parts of speech match.

It will be appreciated that rather than performing a naïve analysis examining all possible combinations of all affixes of an agglutinative language without regard to the morpho-syntactical rules governing valid affix groups and the valid order of affix types, the automaton of the present invention incorporates such validity rules in order to greatly reduce the number of possible affix sequences. The automaton of the present invention may thus be employed for efficient analysis of words of agglutinative languages.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A method for constructing an automaton for automated analysis of an agglutinative language, the method comprising:

constructing, using a processor of a computer, an affix automaton for each of a plurality of affix types of the agglutinative language, wherein each of said affix types is associated with one or more affixes associated with a morphological concept;

combining, using the processor of the computer, any of said affix automatons to form a plurality of template automatons, where each of said template automatons is patterned after any of a plurality of agglutination templates of any of said affix types for said agglutinative language;

combining, using the processor of the computer, said template automatons into a master automaton;

receiving, by the processor of the computer, a word in the agglutinative language as an input for analysis;

executing the master automaton to perform a morphological analysis of the received word, using the processor of the computer; and responsive to the executing, producing an output that indicates an expected part of speech for the word based on which of said template automatons were traversed within said master automaton during the executing.

2. The method according to claim 1, wherein said constructing an affix automaton comprises constructing any of said affix automatons from a union of a plurality of said affixes associated with one of said morphological concepts.

3. The method according to claim 1, wherein said constructing an affix automaton comprises constructing any of said affix automatons by starting with a last letter of each of said affixes and continuing towards a beginning letter of each of said affixes.

4. The method according to claim 1, wherein said constructing an affix automaton comprises breaking down any of said affixes into its constituent letters prior to construction of its associated affix automaton.

5. The method according to claim 1, wherein said combining any of said affix automatons comprises combining the affix automatons according to an order defined in the agglutination template.

6. The method according to claim 1, wherein said combining any of said affix automatons comprises combining ones of the affix automatons constructed for any subset of said affix types indicated in any of said agglutination templates, provided that said subset maintains a same relative order in a result of the combining as in said agglutination template.

7. The method according to claim 1, wherein said combining any of said affix automatons comprises combining, for any selected one of the agglutination templates which includes a gerund separator, the affix automatons constructed for any of said affix types selected from a head section of the selected one of said agglutination templates, the affix automaton constructed for a gerund affix type of said selected one of the agglutination templates, and the affix automatons constructed for any of said affix types selected from a tail section of said selected one of the agglutination templates.

8. The method according to claim 1, wherein said combining any of said affix automatons comprises, for any selected one of the agglutination templates, combining any of said affix automatons in an order in which their corresponding affix types appear in the selected one of said agglutination templates.

9. The method according to claim 8, wherein said combining any of said affix automatons in an order comprises combining the any affix automatons starting with the affix automaton constructed for a last affix type in said selected agglutination template.

10. A system for analyzing words of an agglutinative language, comprising:
a computer comprising a processor and a memory;
a master automaton stored in the memory, the master automaton formed by:
constructing an affix automaton for each of a plurality of affix types of the agglutinative language, wherein each of said affix types is associated with one or more affixes associated with a morphological concept;
combining any of said affix automatons to form a plurality of template automatons, where each of said template automatons is patterned after any of a plurality of agglutination templates of any of said affix types for said agglutinative language; and
combining said template automatons into a master automaton; and
instructions which are executable, using the processor, for analyzing a word in the agglutinative language using said master automaton, further comprising:
receiving a word in the agglutinative language;
executing the master automaton to perform the analysis of the received word; and
responsive to the executing, producing an output that indicates an expected part of speech for the word based on which of the template automatons were traversed within the master automaton during the executing.

11. The system according to claim 10, wherein the executing the master automaton is operative to perform a letter-by-letter traversal of said master automaton using letters of the word, where each letter of said word is tested by a transition function of said automaton.

12. The system according to claim 11, wherein the executing the master automaton is operative to record each successfully-traversed affix type traversed within said master automaton until no more valid affixes are discovered for said word using the master automaton.

13. The system according to claim 10, wherein the executing the master automaton is operative to perform a dictionary look-up of a portion of said word beyond a letter corresponding to a last valid affix found when traversing the master automaton, the dictionary look-up determining a part of speech for said word.

14. The system according to claim 13, wherein the executing the master automaton is operative to compare the expected part of speech indicated for said word by said master automaton with the part of speech determined for said word by said dictionary look-up to determine whether said parts of speech match.

15. A system for constructing an automaton for automated analysis of an agglutinative language, the system comprising:
a computer comprising a processor; and
instructions which are executable, using the processor, to implement functions comprising:
constructing an affix automaton for each of a plurality of affix types of the agglutinative language, wherein each of said affix types is associated with one or more affixes associated with a morphological concept;
combining any of said affix automatons to form a plurality of template automatons, where each of said template automatons is patterned after any of a plurality of agglutination templates of any of said affix types for said agglutinative language;
combining said template automatons into a master automaton, the master automation operable for analyzing a word in the agglutinative language;
receiving a word in the agglutinative language as an input for analysis;
executing the master automaton to perform the analysis of the received word; and
responsive to the executing, producing an output that indicates an expected part of speech for the word based on which of the template automatons were traversed within the master automaton during the executing.

16. The system according to claim 15, wherein the constructing an affix automaton is operative to construct any of said affix automatons from a union of a plurality of said affixes associated with one of said morphological concepts.

17. The system according to claim 15, wherein the constructing an affix automaton is operative to construct any of said affix automatons by starting with a last letter of each of said affixes and continuing towards a beginning letter of each of said affixes.

18. The system according to claim 15, wherein the constructing an affix automaton is operative to break down any of said affixes into its constituent letters prior to construction of its associated affix automaton.

19. The system according to claim 15, wherein the combining any of said affix automatons is operative to combine the affix automatons according to an order defined in the agglutination template.

20. The system according to claim 15, wherein the combining any of said affix automatons is operative to combine ones of the affix automatons constructed for any subset of said affix types indicated in any of said agglutination templates, provided that said subset maintains a same relative order in a result of the combining as in said agglutination template.

21. The system according to claim 15, wherein the combining any of said affix automatons is operative to combine, for any selected one of the agglutination templates which includes a gerund separator, the affix automatons constructed for any of said affix types selected from a head section of the selected one of said agglutination templates, the affix automaton constructed for a gerund affix type of said selected one of the agglutination templates, and the affix automatons constructed for any of said affix types selected from a tail section of said selected one of the agglutination templates.

22. The system according to claim 15, wherein the combining any of said affix automatons is operative to combine, for any selected one of the agglutination templates, any of said affix automatons in an order in which their corresponding affix types appear in the selected one of said agglutination templates.

23. The system according to claim 22, wherein the combining any of said affix automatons in an order is operative to combine the any affix automatons starting with the affix automaton constructed for a last affix type in said selected agglutination template.

24. A computer program embodied on a non-transitory computer-readable medium, the computer program comprising program segments which, when executed by a computer, perform:

constructing an affix automaton for each of a plurality of affix types of an agglutinative language, wherein each of said affix types is associated with one or more affixes associated with a morphological concept;

combining any of said affix automatons to form a plurality of template automatons, where each of said template automatons is patterned after any of a plurality of agglutination templates of any of said affix types for said agglutinative language;

combining said template automatons into a master automaton, the master automation operable for analyzing a word in the agglutinative language;

receiving a word in the agglutinative language as an input for analysis;

executing the master automaton to perform the analysis of the received word; and responsive to the executing, producing an output that indicates an expected part of speech for the word based on which of the template automatons were traversed within the master automaton during the executing.

25. The method according to claim 1, further comprising sending the output to at least one of a natural-language query processor or a search engine for use therein.

\* \* \* \* \*